United States Patent [19]
Miyake et al.

[11] Patent Number: 5,743,930
[45] Date of Patent: Apr. 28, 1998

[54] APPARATUS FOR PRODUCING INORGANIC SPHERICAL PARTICLES

[75] Inventors: Shinichi Miyake; Takeru Yajima, both of Yamanashi, Japan

[73] Assignee: Nippon Sanso Corporation, Tokyo, Japan

[21] Appl. No.: 788,335

[22] Filed: Jan. 27, 1997

[30] Foreign Application Priority Data

Sep. 18, 1996 [JP] Japan .................... 8-246148

[51] Int. Cl.$^6$ .................................................... B29B 9/00
[52] U.S. Cl. .................... 65/142; 65/21.1; 425/6; 425/7
[58] Field of Search .................... 65/21.1, 21.3, 65/25.1, 142; 425/6, 7; 264/11, 12, 13, 15

[56] References Cited

FOREIGN PATENT DOCUMENTS

| | | |
|---|---|---|
| 60-106524 | 6/1985 | Japan . |
| 4-126538 | 4/1992 | Japan . |
| 5-59784 | 8/1993 | Japan . |
| 7-48118 | 2/1995 | Japan . |

*Primary Examiner*—Donald E. Czaja
*Assistant Examiner*—Sean Vincent
*Attorney, Agent, or Firm*—Armstrong, Westerman, Hattori, McLeland & Naughton

[57] ABSTRACT

The apparatus for manufacturing inorganic spherical particles according to the present invention consists of a vertical sphering furnace, a sphering burner disposed at the top of the furnace, a particle outflow pipe through which spherical particles formed in the furnace are drawn out therefrom and an air inflow pipe for introducing air for carrying the spherical particles toward the opening of the particle outflow pipe; wherein the particle outflow pipe and the air inflow pipe are arranged to oppose each other horizontally at a lower position of the furnace. The opening diameter of the particle outflow pipe is designed to be larger than that of the air inflow pipe.

4 Claims, 2 Drawing Sheets

APPARATUS FOR PRODUCING INORGANIC SPHERICAL PARTICLES

BACKGROUND OF THE INVENTION AND RELATED ART STATEMENT

The present invention relates to an apparatus for producing inorganic spherical particles. More particularly, the present invention relates to an apparatus for producing inorganic spherical particles by supplying a raw material inorganic powder into a flame.

Conventionally, inorganic spherical particles have been produced by supplying a raw material inorganic powder into a flame, and various improvements have been proposed for the constitution of apparatus to be employed for such purpose. For example, Japanese Patent Publication No. Hei 5-59784 discloses a manufacturing-treating apparatus in which masses of fused particles which are inevitably formed in a sphering burner and a furnace are securely excluded to collect inorganic spherical particles.

The manufacturing-treating apparatus described above consists of a furnace, as a sphering chamber, having a sphering burner; a cooling chamber, into which a cooling gas is supplied, having a discharge port for discharging sphered product at the bottom; and a sphered product separation-discharge unit. The inner wall of the furnace has a predetermined thickness of self-lining layer so as to prevent contamination of the product by refractory materials constituting the furnace. The thickness of the self-lining layer is adjusted by controlling the furnace wall temperature by the flow rate of coolant flowing through a water-cooling jacket surrounding the furnace. According to this constitution, masses of fused particles are inevitably formed in the furnace, so that it is essential to employ such sphered product separation-discharge unit having a complicated structure as described above in order to securely exclude such masses and to collect spherical particles only.

While masses of fused particles formed in the sphering chamber can be securely excluded to be able to collect spherical particles efficiently in this manufacturing-treating apparatus, the structure of the apparatus becomes inevitably complicated for separating and discharging the sphered product, since deposit is adapted to grow on the furnace wall constantly to a predetermined thickness. Further, a sophisticated technique is required for maintaining the deposit layer on the inner wall of the furnace to the predetermined thickness, and if an extra amount of deposit is formed on the furnace wall due to operation of the apparatus out of predetermined conditions, points of protrusion present on the surface of the deposit are preferentially heated to accelerate deposition successively. In the worst cases, the furnace is liable to be blocked.

Meanwhile, Japanese Unexamined Patent Publication No. Hei 4-126538 discloses an apparatus having an air suction hole for lowering the temperature of the gas to be discharged from the sphering furnace in a connecting pipe for connecting the sphering furnace and the spherical particle collecting unit.

In this apparatus, while a cyclone or a bag filter is employed as a collector for recovering spherical particles, a large amount of air for cooling the combustion gas and the combustion gas are combined to be introduced in a huge amount into the cyclone if the air suction pipe is located on the upstream side of the cyclone, so that the cyclone must be of an extremely great size.

OBJECT AND SUMMARY OF THE INVENTION

It is an objective of the present invention to provide an apparatus for manufacturing inorganic spherical particles, which can reduce formation of masses of fused particles at a sphering burner and in a sphering furnace and which can guide substantially entire amount of sphered product flowing down the furnace into a collector to enable efficient manufacturing of inorganic spherical particles.

A first aspect of the present invention relates to an apparatus for manufacturing inorganic spherical particles containing a vertical sphering furnace and a sphering burner disposed at the top of the furnace to face vertically downward;

the furnace further comprising a particle outflow pipe through which spherical particles formed in the furnace are drawn out therefrom, and an air inflow pipe for introducing air for carrying the spherical particles toward an opening of the particle outflow pipe; wherein the particle outflow pipe and the air inflow pipe are aligned to oppose each other horizontally at a lower position of the furnace, and the opening diameter of the particle outflow pipe is adapted to be greater than that of the air inflow pipe.

A second aspect of the present invention relates to an apparatus for manufacturing inorganic spherical particles containing a vertical sphering furnace, a sphering burner disposed at the top of the furnace to face vertically downward and a spherical particle collector for recovering spherical particles formed in the furnace;

the burner further comprising a raw material powder supply passage defined at the center, through which an inorganic raw material powder is supplied being carried on oxygen or an oxygen rich air as a carrier gas, a fuel gas supply passage defined around the raw material powder supply passage, a primary oxygen supply passage defined around the fuel gas supply passage, a secondary oxygen supply passage defined around the primary oxygen supply passage, and a combustion chamber having a diameter increasing gradually outward, which communicates to each distal extremity of each passage; the primary oxygen supply passage having a plurality of first injection holes for injecting oxygen from the lateral side of the combustion chamber in such a direction as to form a tangential flow in the combustion chamber; the secondary oxygen supply passage having a plurality of second injection holes which inject oxygen on the downstream side of the first injection holes toward the burner axis; and the furnace further comprising a barrier air introducing holes for introducing barrier air tangentially downward along the cylindrical inner furnace wall; a particle outflow pipe through which spherical particles formed in the furnace are drawn out therefrom and an air inflow pipe for introducing air for carrying the spherical particles toward an opening of the particle outflow pipe, wherein the particle outflow pipe and the air inflow pipe are aligned to oppose each other horizontally at a lower position of the furnace, and the opening diameter of the particle outflow pipe is adapted to be greater than that of the air inflow pipe; and an auxiliary carrier air introducing hole defined at the bottom of the furnace.

In the second aspect, the spherical particle collector contains a cyclone and a bag filter disposed serially on the downstream side of the cyclone, with a cooling air introducing section having a flow control mechanism being provided between the cyclone and the bag filter.

In the second aspect, the vertical sphering furnace has at the bottom thereof a viewing window for looking up vertically into the inside of the furnace.

According to the apparatus for manufacturing inorganic spherical particles according to the present invention, since sphered product formed by the sphering burner can be entirely guided effectively into the collector such as a cyclone, there is no need of employing intricate control for maintaining the predetermined thickness of deposit layer or sphered product separation-discharge unit having a complicated structure, leading to reduction in the facility cost.

Further, by introducing cooling air between the cyclone and the bag filter, the cyclone need not be of an excessively big size, enabling to provide an economic apparatus. Further, by providing a viewing window at the bottom of the furnace so as to look up into the furnace, it is possible to look overall the inside of the furnace, facilitating inspection of the burner tip, flame condition, furnace wall condition, etc.

BRIEF DESCRIPTION OF THE DRAWINGS

The features of the present invention that are believed to be novel are set forth with particularity in the appended claims. The invention, together with the objects and advantages thereof, may best be understood by reference to the following description of the presently preferred embodiments taken in conjunction with the accompanying drawings in which:

DETAILED DESCRIPTION OF THE PREFERRED EMBODIMENTS

A preferred embodiment of the present invention will be described specifically referring to the attached drawings.

Figure 1:
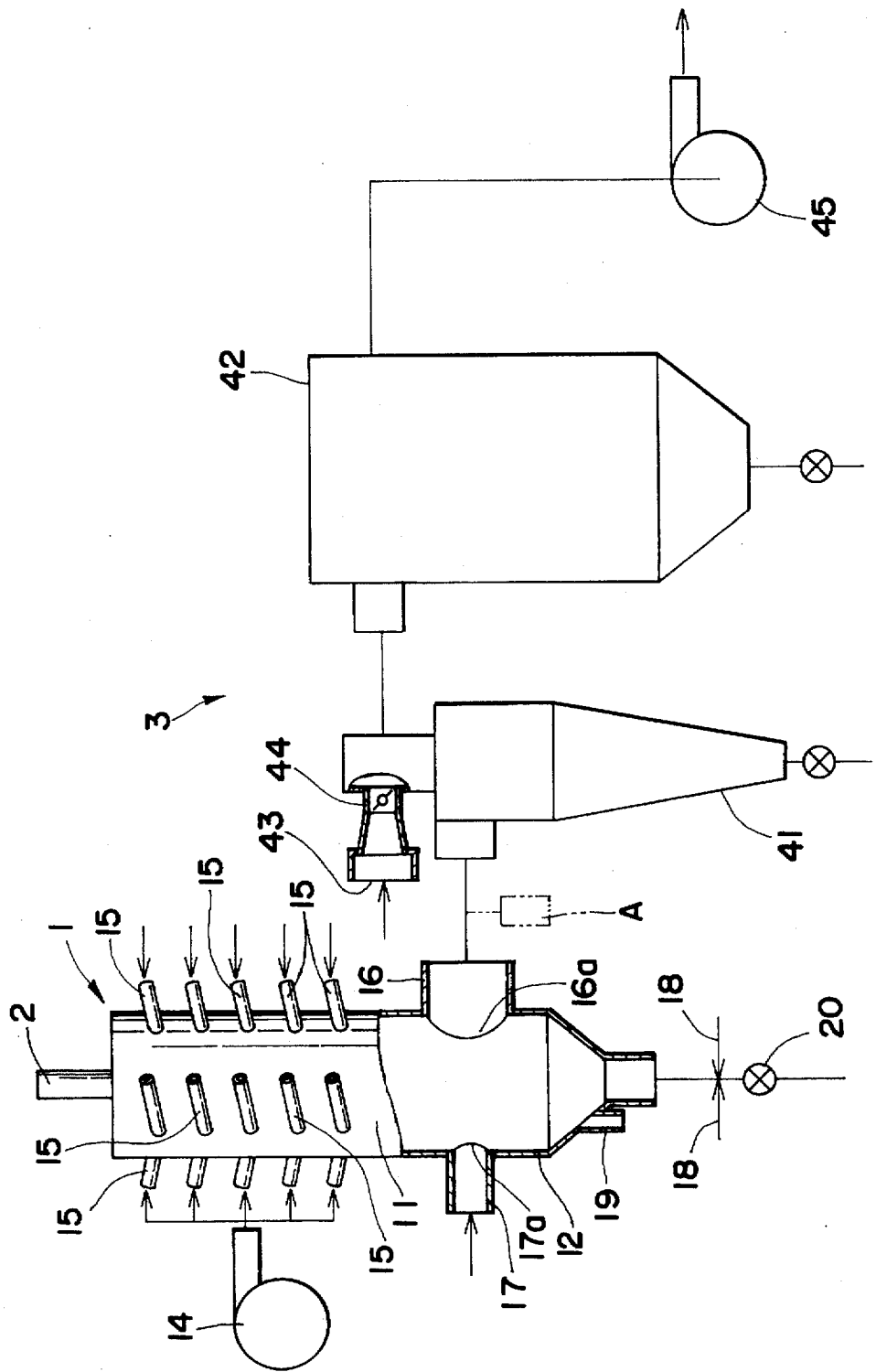
FIG. 1 shows a schematic drawing of the apparatus for manufacturing inorganic spherical particles according to one embodiment of the invention.

The apparatus for manufacturing inorganic spherical particles according to the preferred embodiment of the invention shown in FIG. 1 contains a vertical sphering furnace 1, a sphering burner 2 located at the top of the sphering furnace 1 and a spherical particle collector 3 for recovering spherical particles formed in the sphering furnace 1. The sphering burner 2 is disposed at the top of the sphering burner 1 such that flames may burst vertically downward.

Figure 2:
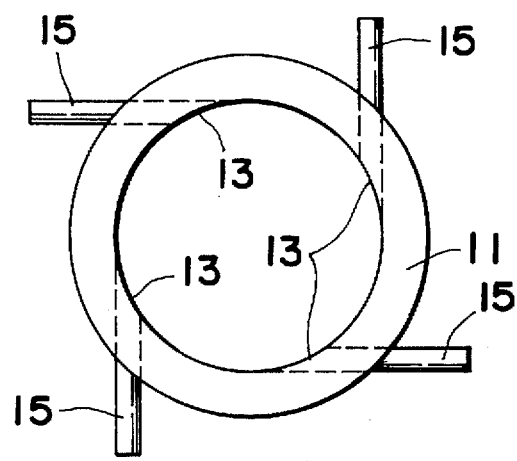
FIG. 2 shows schematically a plan view of the sphering furnace in the apparatus for manufacturing inorganic spherical particles shown in FIG. 1.

The sphering furnace 1 contains a cylindrical furnace main body 11 and a sphered product withdrawing section 12 connected to the lower end of the furnace main body 11. As shown in FIG. 2, the furnace main body 11 has a plurality of barrier air introducing holes 13. The barrier air introducing holes 13 are defined in the furnace wall of the furnace main body 11 such that barrier air to be supplied from a blower 14 through barrier air introducing pipes 15 may be introduced tangentially downward along the cylindrical inner wall of the furnace. In this embodiment, twenty barrier air introducing holes 13 in total are defined in four vertical rows and at five stages, and the four holes at each stage are arranged at equiangular (90°) intervals in the circumferential direction. The amount of air to be introduced into the furnace through these barrier air introducing holes 13 may be set taking the size of the furnace, temperature drop in the furnace, etc. into consideration.

Since a downward vortex current air layer can be formed on the surface of the inner furnace wall by introducing barrier air along the inner wall surface of the sphering furnace 1, the sphered product formed in the furnace can be prevented from adhering and depositing gradually on the inner wall surface.

The sphered product withdrawing section 12 has a particle outflow pipe 16 and an air inflow pipe 17. The particle outflow pipe 16 and the air inflow pipe 17 are aligned horizontally to oppose each other to be orthogonal to the axis of the furnace. The diameter of the opening 16a of the particle outflow pipe 16 is designed to be greater than that of the opening 17a of the air inflow pipe 17. Thus, the gas flowing from the opening 17a to the opening 16a can be guided efficiently into the particle outflow pipe 16, and an ejector-like action is generated in this gas stream to facilitate feeding of the sphered product into the particle outflow pipe 16.

Accordingly, substantially all of the sphered product coming to the sphered product withdrawing section 12 is drawn out of the furnace through the particle outflow pipe 16 being carried on the spherical particle carrier air flowing in through the air inflow pipe 17 toward the opening 16a of the particle outflow pipe 16. The opening ratio of the opening 16a to the opening 17a can be set depending on the capacity of manufacturing inorganic spherical particles or the size of the sphering furnace 1, the amount of combustion gas, temperature and other conditions, and the amount or air to be introduced through the air inflow pipe 17 and the flow rate thereof can be set as desired. Further, the air to be introduced through the air inflow pipe 17 has a function of lowering the temperature of the combustion gas formed at the sphering burner 2 to a level suitable for the treatment to be carried out in the spherical particle collector 3. However, the larger is the amount of air introduced for lowering the temperature of the combustion gas, the greater should be the capacity of the spherical particle collector 3, so that the amount of air should be as small as possible.

An auxiliary carrier air introducing pipe 18 is provided at the bottom of the furnace below the sphered product withdrawing section 12. This auxiliary carrier air introducing pipe 18 is mainly aimed at protecting the bottom of the furnace against heat. The air to be introduced through the auxiliary carrier air introducing pipe 18 into the sphered product withdrawing section 12 forms an upward stream in the furnace bottom to prevent the sphered product from falling to the furnace bottom. Since the sphered product is prevented from falling to the furnace bottom by this falling preventive action of the air, the entire amount of sphered product formed is fed through the particle outflow pipe 16 to the spherical particle collector 3.

Meanwhile, a viewing window 19 for looking up into the furnace is provided substantially vertically at the bottom of the sphering furnace 1. In the apparatus for manufacturing inorganic spherical particles, since the product inorganic spherical particles are required to have a purity of more than a predetermined level (migration of impurities should be minimized), the sphering furnace 1 is allowed to have a closed structure. In the furnace having such closed structure, the viewing window for inspecting the inside of the furnace during operation is indispensable, and the position of the viewing window is significant in operating the furnace. If the viewing window is located at the top of the furnace, the condition of the flame bursting out of the sphering burner 2 and the condition of the tip of the burner cannot be observed; whereas if it is located at the furnace wall, only a part in the furnace opposing the viewing window can be observed. On the other hand, if the viewing window is provided at the bottom of the furnace to look up into the furnace as described above, the inside of the furnace can be looked overall during operation, and this single viewing window enables ensured inspection of the condition at the tip of the burner 2, the condition of flame and the condition of the furnace wall.

A valve 20, which is disposed to the bottom of the sphering furnace 1, is employed for maintenance service and the like and is normally closed during normal operation of the furnace.

The sphering burner 2 has a multiple wall structure and is disclosed in Japanese Unexamined Patent Publication No. Hei 7-48118 filed by the present applicant.

Figure 3:
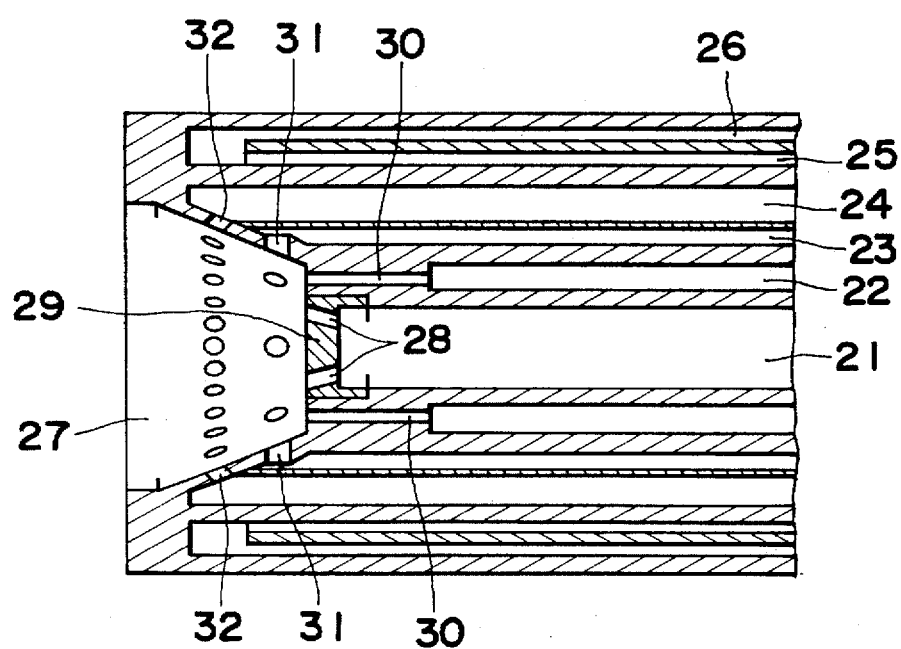
FIG. 3 shows a cross-sectional view of the major section of the sphering burner in the apparatus for manufacturing inorganic spherical particles shown in FIG. 1.

As shown in FIG. 3, the sphering burner 2 has from the center successively outward a raw material powder supply passage 21, a fuel gas supply passage 22, a primary oxygen supply passage 23, a secondary oxygen supply passage 24 and coolant passages 25,26. A raw material inorganic powder is supplied being carried on a carrier gas to the raw material powder supply passage 21. The carrier gas is oxygen or an oxygen rich air. A fuel gas such as a natural gas or propane gas is supplied to the fuel gas supply passage 22. Oxygen or an oxygen rich gas is supplied to the primary and secondary oxygen supply passages 23,24.

A combustion chamber 27 is formed to communicate to the distal extremity of the each passage. The diameter of the combustion chamber 27 is increased outward. A powder diffusing plate 29 having a plurality of small holes as raw material powder injection holes 28 is located between the combustion chamber 27 and the raw material powder supply passage 21. The fuel gas supply passage 22 and the combustion chamber 27 communicate to each other through a multiplicity of small holes serving as fuel injection holes 30. A plurality of first injection holes 31 are defined at the distal extremity of the primary oxygen supply passage 23. These first injection holes 31 inject oxygen or an oxygen rich gas from the lateral side of the combustion chamber 27 in such a direction as to form a tangential flow in the combustion chamber 27. A plurality of second injection holes 32, which inject oxygen on the downstream side of the first injection holes 31 toward the axis of the burner, are provided at the distal extremity of the secondary oxygen supply passage 24.

Since the sphering burner 2 is of diffusion type, there is no fear of back-firing. Since the raw material powder is supplied with the aid of the carrier gas such as oxygen or an oxygen rich air through the raw material powder supply passage 21, such carrier gas is very safe and can be handled easily when leakage to be caused by natural abrasion of the piping is taken into consideration. Further, in the combustion chamber 27, since the raw material powder is injected to be diffused together with oxygen or the oxygen rich air through the raw material powder injection holes 28 defined at the central position and the fuel gas is injected through the fuel injection holes 30 defined around the raw material powder injection holes 28, and since the primary oxygen gas and the secondary oxygen gas are injected through the first injection holes 31 defined around the fuel injection holes 30 to form a tangential flow and through the second injection holes 32 toward the axis of the burner, respectively, the fuel gas and the oxygen gas are mixed intimately to give stable high-temperature flames. Besides, the tangential flow of the primary oxygen gas prevents the sphered product from depositing onto the tip of the sphering burner 2.

Further, since the raw material powder can be diffused radially by defining the raw material powder injection holes 28 radially in the direction of injection, the raw material powder can be dispersed into the flames to achieve efficient heating of the raw material powder. In addition, since the periphery of the combustion chamber 27 is cooled by the coolant flowing through the coolant passages 25,26, not only the nozzle is prevented from undergoing melting, but also the inner surface of the combustion chamber 27 is prevented from being overheated, so that it can be avoided that the oxide film formed on the surface of the combustion chamber 27 is lifted off to contaminate the sphered product.

Further, by controlling the ratio of oxygen to be supplied through the primary oxygen passage 23 to that to be supplied through the secondary oxygen passage 24, optimum combustion state for manufacturing spherical particles can be obtained. For example, if the percentage of the primary oxygen to be supplied through the primary oxygen supply passage 23 is increased, the primary oxygen is mildly mixed with the secondary oxygen to be supplied through the secondary oxygen passage 24 to give flames having a low temperature around the nozzle outlet and a high temperature in the downstream region. On the contrary, if the percentage of the primary oxygen is reduced, mixing of the primary oxygen with the secondary oxygen is accelerated to give flames having a relatively high temperature around the nozzle outlet.

Accordingly, when the raw material powder to be treated has a small average particle size, an excessively high temperature region is not necessary when aggregates of powder particles are deagglomerated, and it is effective to allow the powder particles to assume a dispersed state when they pass through the high temperature region. Therefore, the percentage of the primary oxygen may be increased.

Meanwhile, when the raw material powder to be treated has a large average particle size, it is essential that the flames have a high temperature, so that the percentage of the primary oxygen may be reduced. Thus, the raw material powder can be sphered efficiently depending on the average particle size thereof.

Since the sphering burner 2 is of a diffusion type to which a fuel gas and an oxygen gas are supplied through separate passages respectively, the amount of fuel gas and that of oxygen gas can be reduced to lower the combustion rate, facilitating turn-down operation of the burner depending on the amount of product spherical powder to be manufactured.

Accordingly, since the sphered product is prevented from depositing on the sphering burner 2 and onto the inner wall of the furnace, the entire amount of sphered product formed by the sphering burner 2 can be transferred to the sphered product withdrawing section 12. Further, since masses of fused particles to be formed by deposition of the sphered product can be avoided, the sphered product can be securely fed to the spherical particle collector 3 using the sphered product withdrawing section 12 having such simple structure, leading to reduction in the facility cost and improvement in the % recovery of the inorganic spherical particles.

The spherical particle collector 3 contains a cyclone 41 and a bag filter 42 disposed downstream serially to the cyclone 41. The sphered product withdrawn through the particle outflow pipe 16 of the sphering furnace 1 is subjected to solid-gas separation in the cyclone 41, and after large particles are recovered in the cyclone 41, fine particles are collected and recovered in the bag filter 42. In this instance, the gas flowing into the cyclone 41 is a gaseous mixture of the combustion gas formed at the sphering burner 2, the barrier air introduced through the barrier air introducing pipes 15 and the spherical particle carrier air introduced through the air inflow pipe 17, and this gaseous mixture is cooled to a temperature of 400° C. or lower, at which the spherical particles can be treated in the cyclone 41 having an ordinary structure, by suitably setting the amount of air for carrying the spherical particles.

The cyclone 41 has at the gas outlet a cooling air introducing section 43 for lowering the temperature of the gas fed from the cyclone 41 to the bag filter 42. This cooling air introducing section 43 is provided with a damper 44 as a flow control mechanism for controlling the amount of cooling air to be introduced. By providing the damper 44 at the cooling air introducing section 43 the temperature of the gas flowing into the bag filter 42 can be adjusted to be within the range of between and including 180° C. (heat resistance temperature of the filter cloth of an ordinary bag filter) and 100° C. at which it does not occur that the moisture in the gas undergoes condensation to adhere on the filter cloth, while increase in the amount of gas is held minimum. Referring to the site where the cooling air introduction section 43 is to be located, it is preferably very close to the gas outlet of the cyclone 41 so that the high-temperature gas may be mixed fully with the cooling air and cooled thereby before it flows into the bag filter 42.

As described above, the temperature of the gas flowing into the cyclone 41 or the bag filter 42 can be adjusted to an optimum range by subjecting the gas to a first-step temperature reduction with the air for carrying the spherical particles introduced to the sphered product withdrawing section 12 through the air inflow pipe 17 and then to a second-step temperature reduction with the cooling air to be introduced through the cooling air introduction section 43, and thus increase in the amount of gas can be controlled, so that the cyclone 41 need not be of excessively large size, leading to reduction in the facility cost.

Incidentally, the air for carrying the spherical particles introduced through the air inflow pipe 17 and the cooling air introduced through the cooling air introducing section 43 may be adapted to be sucked under the suction force of a suction blower 45 located at the downstream end, or a suitable blower may be located on the upstream side of the air inflow pipe 17 or the cooling air introducing pipe 43 to force-feed air thereto. Otherwise, such suction blower and force-feed blower may be employed in combination.

Test Examples

Spherical particle production test was carried out using a manufacturing apparatus shown in FIGS. 1 and 2 and a sphering burner having the structure shown in FIG. 3.

First, to the sphering burner were supplied LP gas as a fuel at a rate of 30 Nm$^3$/h, an oxygen gas as an inorganic raw material powder carrier gas at a rate of 30 Nm$^3$/h and a pulverized natural quartz powder as a raw material inorganic powder at a rate of 180 kg/h respectively. When sphering treatment was carried out by changing the flow rate of the primary oxygen and that of the secondary oxygen from a combination of 10 Nm$^3$/h and 110 Nm$^3$/h to a combination of 60 Nm$^3$/h and 60 Nm$^3$/h with the increment and decrement of 10 Nm$^3$/h, respectively, it was confirmed that the optimum combination is the primary oxygen of 50 Nm$^3$/h and the secondary oxygen of 70 Nm$^3$/h. More specifically, when the amount of primary oxygen is small, there was observed a phenomenon that fused quarts powder deposited to grow into masses in the combustion chamber and that they drop off from the combustion chamber periodically. However, when the flow rate of the primary oxygen to that of the secondary oxygen was 50:70, substantially no deposition was observed in the combustion chamber. It was also confirmed that the true specific gravity of the sample collected in the cyclone was substantially the same as that of quartz glass and that the sample was fully fused.

As the sphering furnace, one having an inside diameter of 600 mm and a height of 3,000 mm was employed. The barrier air introducing holes were defined in the furnace wall in four vertical rows and at five stages, and air was injected through each barrier air introducing hole at a rate of 100 Nm$^3$/h, so that the barrier air may be spread evenly over the entire inner wall surface. As a result, substantially no deposit was formed on the furnace wall, and the apparatus was able to be operated continuously for a long time. Incidentally, when feeding of barrier air was stopped, the inner wall of the furnace was partly heated to the fusing temperature of quartz or higher, and deposit grew around the heated portion to form masses which fell onto the bottom of the furnace to cause blocking of the furnace in worst cases.

An air inflow pipe having an inside diameter of 300 mm and a particle outflow pipe having an inside diameter of 650 mm were aligned to oppose each other at the bottom of the sphering furnace, and air for carrying the spherical particles was introduced through the air inflow pipe into the furnace at a rate of 3,000 Nm$^3$/h. Further, air was introduced through the auxiliary carrier air introducing pipe provided at the bottom of the furnace at a rate of 300 Nm$^3$/h. Thus, the entire amount of spherical particles formed in the furnace was able to be fed out through the particle outflow pipe into the cyclone with no spherical particle remaining in the furnace.

In this instance, the temperature of the gas at the inlet of the cyclone was 380° C., and the amount of the gas was enough to perform collection and recovery treatment in the cyclone having an inside diameter of 620 mm. Further, the spherical particles recovered in the cyclone were satisfactory in all respects including particle size distribution, fused state, etc.

Further, a cooling air was introduced at a rate of 6,400 Nm$^3$/h through the cooling air introducing section at the outlet of the cyclone. Thus, the temperature of the gas at the inlet of the bag filter was dropped to 180° C. As a control, when a cooling air introducing section A was provided on the piping on the inlet side of the cyclone as indicated by the two-dot chain line in FIG. 1 to introduce a cooling air at a rate of 6,400 Nm$^3$/h, the temperature of the gas at the inlet of the cyclone was dropped to 170° C. However, if an ordinary cyclone which can treat such amount of gas to be supplied thereto is designed, the size of the cyclone will be unrealistically great such that the inner diameter is about 2,000 mm.

Further, a viewing window fitted with a quartz glass window material having a diameter of 45 mm was formed at the bottom of the furnace so as to observe the inside of the furnace. Although the inside of the furnace was not visible during feeding of the raw material, because the sight was screened by the sphered product flowing toward the particle outflow pipe, full view of the inner wall of the furnace and the sphering burner was obtained through the viewing window when feeding of the raw material powder was stopped to be able to evaluate deposition of sphered product and wearing of the refractory material and the like. Meanwhile, another viewing window was formed at the top of the furnace so as to observe the inside of the furnace. In this case, it was possible to observe the lower part of the furnace wall, the bottom of the furnace and the lower part of flames but not the condition at the tip of the sphering burner, the ceiling of the furnace and the upper part of the furnace wall. Further, in the case where the viewing window was formed in the furnace wall, it was possible to observe the opposite side of the furnace wall from the viewing window, but the substantial part of the furnace wall was not observable.

Further, when about 40% turn-down operation of the furnace was performed by feeding the pulverized natural quartz powder at a rate of 70 kg/h, LP gas at a rate of 17 Nm$^3$/h, and the primary and secondary oxygen at a rate of 85 Nm$^3$/h in total in the same flow ratio, the furnace was operated soundly, except that the amount of cooling air to be introduced was controlled such that the temperature of the gas at the inlet of the bag filter may not drop to 100° C. or lower.

Although only one embodiment of the present invention has been described herein, it should be apparent to those skilled in the art that the present invention may be embodied in many other specific forms without departing from the spirit or scope of the invention. Therefore, the present embodiment is to be considered as illustrative and not restrictive, and the invention is not to be limited to the details given herein, but may be modified within the scope of the appended claims.

What is claimed is:

1. An apparatus for manufacturing inorganic spherical particles containing a vertical sphering furnace and a sphering burner disposed at the top of said furnace to face vertically downward, said furnace further comprising:
   a particle outflow pipe through which spherical particles formed in said furnace are drawn out therefrom, and an air inflow pipe for introducing air for carrying said spherical particles toward an opening of said particle outflow pipe;
   wherein said particle outflow pipe and said air inflow pipe are aligned to oppose each other horizontally at a lower position of said furnace; and the opening diameter of said particle outflow pipe is adapted to be greater than that of that of said air inflow pipe.

2. An apparatus for manufacturing inorganic spherical particles containing a vertical sphering furnace, a sphering burner disposed at the top of said furnace to face vertically downward and a spherical particle collector for recovering spherical particles formed in said furnace, said burner further comprising:
   a raw material powder supply passage defined at the center, through which an inorganic raw material powder is supplied being carried on oxygen or an oxygen rich air as a carrier gas;
   a fuel gas supply passage defined around said raw material powder supply passage;
   a primary oxygen supply passage defined around said fuel gas supply passage;
   a secondary oxygen supply passage defined around said primary oxygen supply passage; and
   combustion chamber having a diameter increasing gradually outward, which communicates to the distal extremity of each passage; said primary oxygen supply passage having a plurality of first injection holes for injecting oxygen from the lateral side of said combustion chamber in such a direction as to form a tangential flow in said combustion chamber; said secondary oxygen supply passage having a plurality of second injection holes which inject oxygen on the downstream side of said first injection holes toward the burner axis; and said furnace further comprising:
   a barrier air introducing hole for introducing barrier air tangentially downward along the cylindrical inner furnace wall;
   a particle outflow pipe through which spherical particles formed in said furnace are drawn out therefrom, and an air inflow pipe for introducing air for carrying said spherical particles toward an opening of said particle outflow pipe; wherein said particle outflow pipe and said air inflow pipe are aligned to oppose each other horizontally at a lower position of said furnace; and the opening diameter of said particle outflow pipe is adapted to be greater than that of said air inflow pipe; and
   an auxiliary carrier air introducing hole defined at the bottom of said furnace.

3. The apparatus for manufacturing inorganic spherical particles according to claim 2, wherein said spherical particle collector contains a cyclone and a bag filter disposed serially on the downstream side of said cyclone, with a cooling air introducing section having a flow control mechanism being provided between said cyclone and said bag filter.

4. The apparatus for manufacturing inorganic spherical particles according to claim 2, wherein said vertical sphering furnace has at the bottom thereof a viewing window for looking up vertically into the inside of said furnace.

* * * * *